(12) United States Patent
Krishna

(10) Patent No.: US 11,818,121 B2
(45) Date of Patent: Nov. 14, 2023

(54) LOW COST DEFENSE AGAINST DENIAL-OF-SERVICE ATTACKS

(71) Applicant: MICRO FOCUS LLC, Santa Clara, CA (US)

(72) Inventor: Vamsi Krishna, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/376,999

(22) Filed: Jul. 15, 2021

(65) Prior Publication Data

US 2023/0012577 A1 Jan. 19, 2023

(51) Int. Cl.
  *H04L 9/40* (2022.01)
  *H04L 9/32* (2006.01)
  *H04L 9/08* (2006.01)

(52) U.S. Cl.
  CPC ........ *H04L 63/0846* (2013.01); *H04L 9/0825* (2013.01); *H04L 9/3228* (2013.01); *H04L 63/0807* (2013.01)

(58) Field of Classification Search
  CPC . H04L 63/0846; H04L 9/0825; H04L 9/3228; H04L 63/0807
  See application file for complete search history.

(56) References Cited

U.S. PATENT DOCUMENTS

| | | | |
|---|---|---|---|
| 7,069,438 B2 | 6/2006 | Balabine | |
| 7,752,450 B1* | 7/2010 | Palmer | H04L 63/0838 726/21 |
| 8,151,364 B2 | 4/2012 | Hewitt et al. | |
| 9,077,521 B2 | 7/2015 | Machani | |
| 9,191,814 B2 | 11/2015 | Hazari | |
| 10,136,322 B2 | 11/2018 | Rougier | |
| 10,397,271 B2 | 8/2019 | Reddy et al. | |
| 10,536,436 B1* | 1/2020 | Barbour | H04L 63/0838 |
| 10,735,406 B1* | 8/2020 | Ramanathan | H04L 63/083 |
| 10,984,090 B2 | 4/2021 | Brocious et al. | |
| 2012/0036576 A1* | 2/2012 | Iyer | H04L 63/1441 726/30 |
| 2013/0145170 A1* | 6/2013 | Rese | G06F 21/40 713/183 |

(Continued)

OTHER PUBLICATIONS

Byoungcheon Lee, "Stateless One-time Authenticated Session Resumption in TLS Handshake Using Paired Token", Feb. 3, 2021 (Year: 2021).*

(Continued)

*Primary Examiner* — Henry Tsang
(74) *Attorney, Agent, or Firm* — Sheridan Ross P.C.

(57) ABSTRACT

A first message is received from a first communication device. The first message comprises an authentication token. For example, the authentication token may be a username/password. A determination is made if the first message also comprises a valid temporary password. The temporary password is used to prevent a Denial-of-Service (DOS) attack. In response to the first message comprising the valid temporary password, a determination is made if the authentication token is valid. In response to the authentication token being valid, the first message is responded to in a normal manner. If the first message does not contain the temporary password, the first message is handled based on a DOS message handling process.

20 Claims, 2 Drawing Sheets

(56) References Cited

U.S. PATENT DOCUMENTS

| | | | |
|---|---|---|---|
| 2014/0057599 A1* | 2/2014 | Hazari | H04W 12/062 455/411 |
| 2014/0281506 A1* | 9/2014 | Redberg | H04L 63/0876 713/159 |
| 2018/0129533 A1* | 5/2018 | Pashov | G06F 9/546 |
| 2019/0020678 A1* | 1/2019 | Reddy | H04L 63/1425 |
| 2020/0007531 A1* | 1/2020 | Koottayi | H04L 67/146 |
| 2020/0314091 A1 | 10/2020 | Master | |

OTHER PUBLICATIONS

Byoungcheon Lee; Stateless One-time Authenticated Session Resumption in TLS Handshake Using Paired Token; Department of Information Security, Joongbnu University; Posted Feb. 3, 2021; 13 pages.

* cited by examiner

LOW COST DEFENSE AGAINST DENIAL-OF-SERVICE ATTACKS

FIELD

The disclosure relates generally to network attack prevention and particularly to preventing denial-of-service attacks.

BACKGROUND

Most modern applications use some form of Application Programming Interfaces (API). For example some applications use API calls in the form of Representation State Transfer (REST)/Simple Object Access Protocol (SOAP) calls that are exposed to clients. In the recent times, there is an exponential growth in the way applications talk to each other and hence APIs have become an important aspect of software delivery and service.

On the other side, servers hosting these APIs are vulnerable to an attack known as a Denial-of-Service (DOS) attack. In this cyber-attack, an attacker uses a client (or a pool of clients) to simulate fake API calls thereby overwhelming the server and its resources. This can cause denial of legitimate requests and/or dramatically add delay to the responsiveness of the server.

Currently, there exists defenses that segregate good clients from bad ones based on heuristics. However, the bad actors are also able to simulate similar techniques to overcome these types of defenses. Another technique is to filter using network parameters such as, IP Address, Ports etc. However, there are lot of network configurations in which this kind of technique fails. For example, when the client devices are using HTTP Forward Proxy or Reverse Proxy in their environment. Here, the incoming request carries the client IP address that belongs to Proxy instead of the actual client. Therefore, segregating the request against network address does not work in this configuration.

Another way for solving this problem is to use an authentication layer to prevent unauthorized access. One of the arguments against using the authentication layer for a DOS attack is the cost of resources consumed on the server in order to validate whether the incoming request is properly authenticated or not. Since the primary purpose of authentication goes beyond segregation of good and bad clients, the use of authentication techniques are typically considered resource intensive as a defense against a DOS attack.

SUMMARY

These and other needs are addressed by the various embodiments and configurations of the present disclosure. The present disclosure can provide a number of advantages depending on the particular configuration. These and other advantages will be apparent from the disclosure contained herein.

A first message is received from a first communication device. The first message comprises an authentication token. For example, the authentication token may be a username/password. A determination is made if the first message also comprises a valid temporary password. The temporary password is used to prevent a Denial-of-Service (DOS) attack. In response to the first message comprising the valid temporary password, a determination is made if the authentication token is valid. In response to the authentication token being valid, the first message is responded to in a normal manner. If the first message does not contain the temporary password, the first message is handled based on a DOS message handling process.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
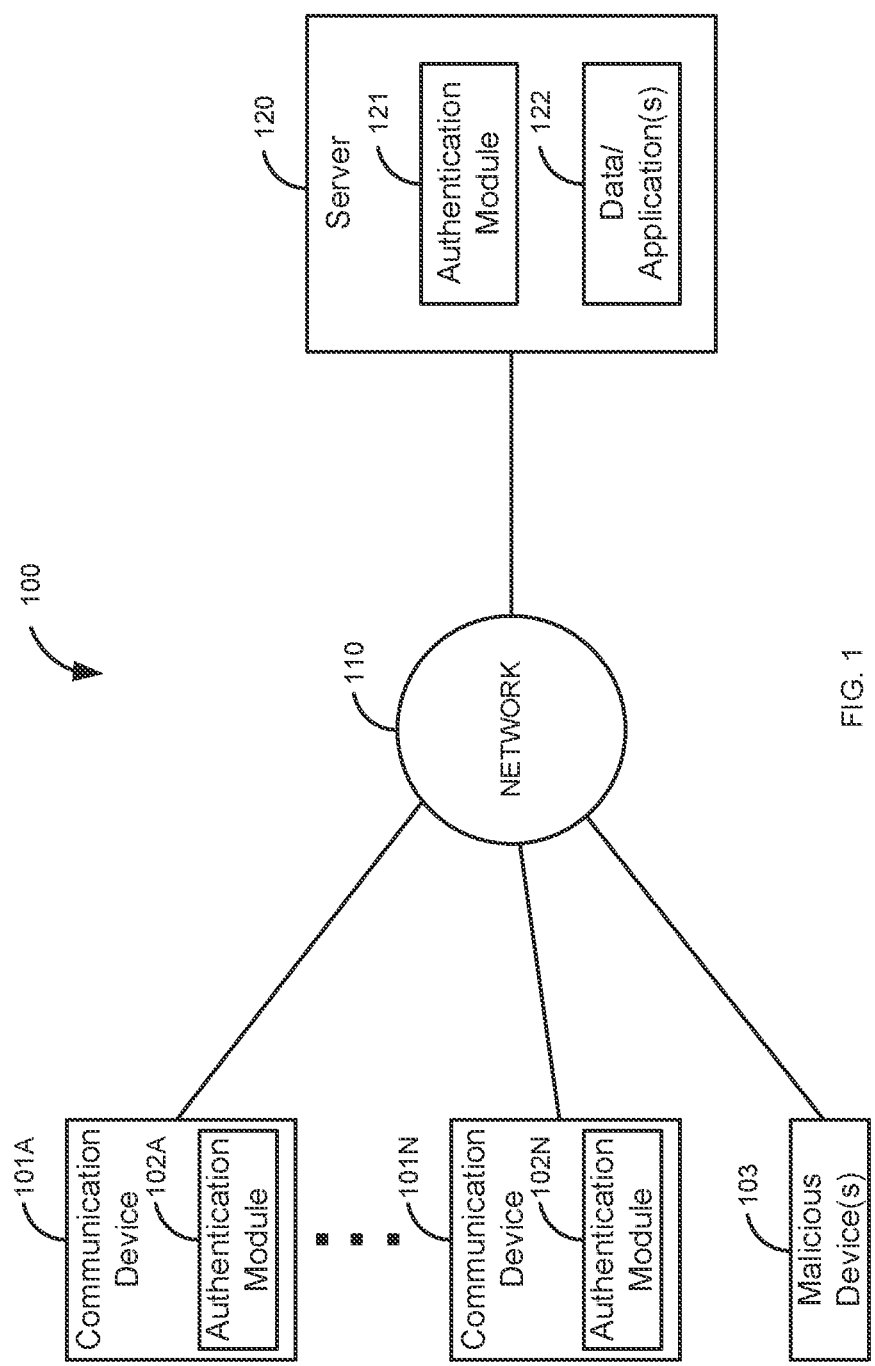
FIG. 1 is a block diagram of a first illustrative system for a low cost defense against a Denial-of-Service (DOS) attack.

FIG. 1 is a block diagram of a first illustrative system 100 for a low cost defense against a Denial-of-Service (DOS) attack. The first illustrative system 100 comprises communication devices 101A-101N, malicious communication device(s) 103, a network 110, and a server 120.

The communication devices 101A-101N can be or may include any device that can communicate on the network 110, such as a Personal Computer (PC), a telephone, a video system, a cellular telephone, a Personal Digital Assistant (PDA), a tablet device, a notebook device, a smartphone, a client device, and/or the like. As shown in FIG. 1, any number of communication devices 101A-101N may be connected to the network 110, including only a single communication device 101.

The communication devices 101A-101N further comprise authentication modules 102A-102N. The authentication modules 102A-102N can be or may include any software/hardware that can assist the communication devices 101A-101N to authenticate to the server 120. The authentication modules 102A-102N may provide various types of services, such as encryption, password authentication, a hash based message authentication, secret sharing (e.g., as provided by Diffie-Hellman), and/or the like.

The malicious devices 103 are communication devices 101 that are used by a malicious actor(s) to provide a DOS attack at the server 120. For example, the malicious devices 103 may try to constantly authenticate to the server 120, thus reducing the server's ability to authenticate and respond to valid users who are using the communication devices 101A-101N. The malicious actor (e.g., a malicious program) may use one or more malicious devices 103.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and/or the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The server 120 can be any type of server, such as, a database server, an authentication server, an email server, a network management server, a communication server, a Private Branch Exchange (PBX) a web server, a collaboration server, a video server, a conferencing servers, and/or the like. The server 120 further comprises an authentication module 121 and data/applications 122.

The authentication module 121 is used to authenticate the communication devices 101A-101N. The authentication module 121 determines if a communication device 101A-101N/malicious devices 103 are being used by valid users/applications. The authentication module 121 is also used to validate messages to identify legitimate communication devices 101A-101N and malicious devices 103.

The data/application 122 may be any application or data that can be accessed on the server 120 via the communication devices 101A-101N. For example, the application 122 may be a web application, an email application, a collaboration application, a voice application, a communication application, an authentication application, and/or the like. The data may comprise data in a database, user data (e.g., a network drive), security data, health information, corporate data, secure data, configuration data, business analytics, and/or the like.

Figure 2:
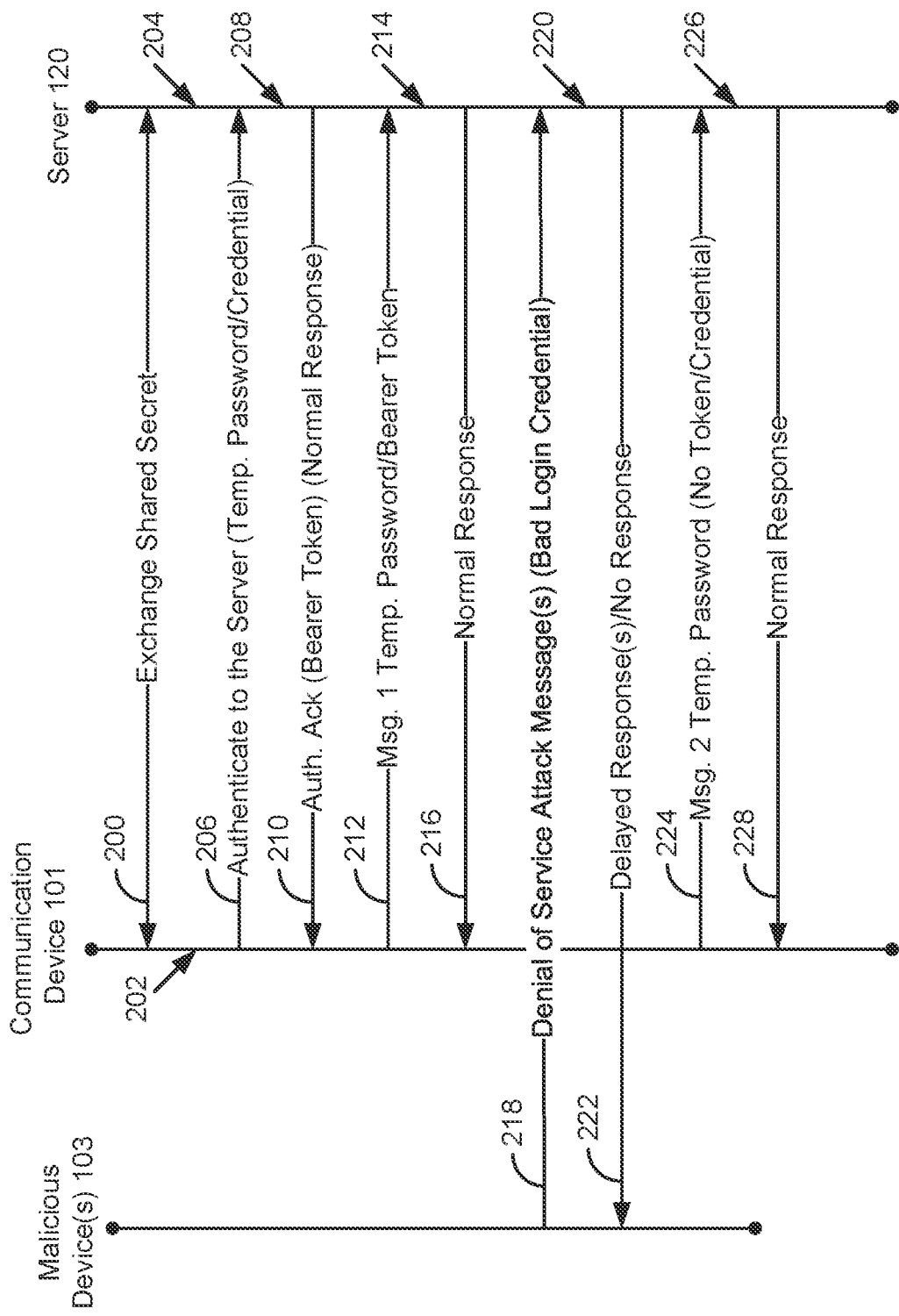
FIG. 2 is a flow diagram of a process for a low cost defense against a Denial-of-Service (DOS) attack.

FIG. 2 is a flow diagram of a process for a low cost defense against a Denial-of-Service (DOS) attack. Illustratively, the communication devices 101A-101N, the authentication modules 102A-102N, the malicious devices 103, the network 110, the server 120, the authentication module 121, and the data/applications 122 are stored-program-controlled entities, such as a computer or microprocessor, which performs the method of FIG. 2 and the processes described herein by executing program instructions stored in a computer readable storage medium, such as a memory (i.e., a computer memory, a hard disk, and/or the like). Although the methods described in FIG. 2 are shown in a specific order, one of skill in the art would recognize that the steps in FIG. 2 may be implemented in different orders and/or be implemented in a multi-threaded environment. Moreover, various steps may be omitted or added based on implementation.

The process starts in step 200 where the communication device 101 and the server 120 exchange a shared secret. For example, the shared secret and be accomplished using the Diffie-Hellman key exchange process as described in https://en.wikipedia.org/wiki/Diffie %E2%80%93Hellman_key_exchange, which is incorporated herein in its entirety. In addition, other processes can be used to exchange the shared secret, such as the use of asymmetric keys. The process of exchanging the shared secret in step 200 may be accomplished other ways, such as, a user registration or device registration process. For example, the shared secret may be a password that is shared when a new user account created or device registration is completed. The process of exchanging shared secrets is well known in the art and the processes described herein are not dependent upon a specific type of process for sharing the shared secret.

Once the communication device 101 and the server 120 have exchanged the shared secret, the authentication modules 102/121 create a Hash based Message Authentication Code (HMAC) temporary password in steps 202/204 (e.g., as described in https://en.wikipedia.org/wiki/HMAC, which is incorporated herein in its entirety). The HMAC process can generate the temporary password to be various lengths. A variant of the HMAC process is to create the temporary password based on a time period. For example, the time period may be for one hour or any defined time period. Once the time period expires, an new temporary password would be generated using the HMAC process by both the communication device 101 and the server 120. The time period could also be an input into the HMAC process to generate the temporary password. Alternatively, the HMAC process could be used to generate a new temporary password for every message (e.g., for a command/response pair of messages) or based on a number of received/sent messages.

In addition to using an HMAC process, other processes may be used to generate the temporary password, such as, a hashing algorithm (e.g., a SHAW 256 hashing algorithm), a key derivation function, a proprietary algorithm, and/or the like. Basically any algorithm may be used that allows both the communication device 101 and the server to be able to generate a common temporary password.

In one embodiment, the temporary password is precomputed by the server 120 prior to the authentication process. The precomputation process may work with some or all of the communication devices 101A-101N that access the server 120. For example, if there are one hundred users who can access the server 120, the server 120 may create temporary passwords for each of the one hundred communication devices 101A-101N. The temporary passwords may be stored in a cache in the server 120 for quick access for screening valid communication devices 101A-101N and malicious devices 103.

When a user and/or application 122 wants to access the server 120 from the communication device 101, the user and/or application 122 typically uses some kind of credential (a type of authentication token), such as, a username/password, a biometric, a digital certificate, a key, and/or the like. The communication device 101 sends, in step 206, an authentication message to authenticate to the server 120. The authentication message of step 206 comprises the credential and the temporary password. The temporary password may be included in a new Hyper-Text-Transport Protocol (HTTP) header. Although described using HTTP, the temporary password (and all the messages described herein) may be sent using other protocols, such as Web Real-Time Protocol (Web RTC), Session Initiation Protocol (SIP), H.224, Extended Markup Language (XML), Representation State Transfer (REST), Simple Object Access Protocol (SOAP), a video based protocol, and/or the like. The authentication message of step 206 (including the temporary password) may be generated using Application Programming Interface (API) calls or may be generated using other methods.

The server 120 determines, in step 208, if the authentication message of step 206 comprises a valid temporary password. If the authentication message of step 206 does not comprise the valid temporary password, the server 120 responds as described below in step 222. Here the authentication message of step 206 comprises the valid temporary password. In response to the authentication message of step 206 comprising the valid temporary password, the server 120 determines, in step 208, that the credential is valid (e.g., a valid user name/password). In response to the credential being valid, the server 120, sends, in step 210, an authentication acknowledgement message (a normal response) that may include a bearer token (a type of authentication token). The bearer token is a type of authentication token used in HTTP during a session to identify the user is authenticated (i.e., to secure the session). Although the process is described using an HTTP bearer token, other types of authentication tokens may be sent in step 210 depending on the type of protocol that is being used. For example, if SIP is being used, a SIP based token may be sent in the message.

After being authenticated, the communication device 101 sends, in step 212, another message (message one). For example, the user browsing a web site served by the server 120 causes message one to be sent. In this example, message one comprises the bearer token and the valid temporary password. The server 120, determines that message one comprises the valid temporary password in step 214. If message one comprises the valid temporary password in step 214, the server 120 validates the bearer token in step 214. If the bearer token is valid in step 214, the server 120 sends, in step 216, a normal response. If the message one does not comprise the valid temporary password or the bearer token is invalid, the server 120 responds as described below in step 222.

The malicious device 103, sends, in step 218, a denial-of-service (DOS) message(s). For example, the DOS message of step 218 may be an authentication message with an invalid username/password. The DOS message of step 218 does not contain the valid temporary password. The server 120 determines, in step 220, that the DOS message does not contain the valid temporary password. In response to the DOS message not containing the valid temporary password, the server 120 may elect to not respond to the DOS message in step 222. Alternatively, the server 120 could wait, to send the message of step 222 using an exponentially increasing delay. For example, the server 120 could send a rejection message in step 222 (e.g., a bad credential message). As additional DOS messages are received, the delay time for sending the message 222 increases exponentially. In another embodiment, the delay may increase for each DOS message using a defined time period. As one of skill in the art would recognize, other delay algorithms may also be employed to calculate the delay in sending message in step 222.

The communication device 101, sends, in step 224, message two. Message two comprises the valid temporary password, but not the bearer token/credential. In HTTP, there are times where messages are sent that don't have the bearer token/credential. For example, when a browser in the communication device 101 has to download images like icons, jpegs etc., the communication device 101 may use APIs that do not require an authentication token. This is because the icons, jpegs, etc. are available resources that don't need authentication. The server 120 determines, in step 226, that the message two contains the valid temporary password. In response, the server 120 responds, in step 228, using a normal response.

The process of step 224 where there is not a token/credential will work with other protocols that don't require a token/credential in each message. For example, a video collaboration application 122 may not send a token/credential in each message (e.g., only when the user first authenticates).

A key advantage to first determining that the messages of steps 206/212 contains the valid temporary password is that the process of verifying the valid temporary password is very efficient (i.e., the valid temporary password is precomputed and stored in a cache). The valid temporary password stored in the cache can be identified quickly using a hash map or other process. The process of identifying the valid temporary password is a lot less processor intensive than verifying a credential/bearer token. For example, when the DOS message is received in step 218, if the authentication module 121 had to validate the credential/bearer token first, this would take a lot more processing resources than a quick hash map lookup in a table of temporary passwords stored in a cache. Thus, the valid temporary password provides a simple, but effective solution to filter out DOS messages generated in a DOS attack while still allowing access for valid communication devices 101A-101N. This results is more processing resources that are available to process legitimate message from the communication devices 101A-101N.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a microprocessor; and
   a computer readable storage medium, coupled with the microprocessor and comprising microprocessor readable and executable instructions that, when executed by the microprocessor, cause the microprocessor to:
   receive a shared secret from a first communication device;
   create a temporary password based at least in part on the shared secret;
   receive a first message, from the first communication device, wherein the first message comprises an authentication token;
   determine whether the first message also comprises the temporary password; and
   in a first mode, in response to the first message comprising a valid temporary password, determine if the authentication token is valid and in response to the authentication token being valid, respond to the first message in a normal manner; and
   in a second mode, in response to the first message not comprising the valid temporary password, determine that the first message is a Denial-of-Service attack and do not respond to the first message in a normal manner.

2. The system of claim 1, wherein the authentication token is an authentication credential and wherein the microprocessor readable and executable instructions further cause the microprocessor in response to the first message comprising the valid temporary password and valid authentication token, to send to the first communication device an authentication acknowledgement message comprising a bearer token different from the authentication token that identifies a user as authenticated.

3. The system of claim 2, wherein the microprocessor readable and executable instructions further cause the microprocessor to:
   receive a second message from the first communication device;
   determine if the second message comprises the valid temporary password; and
   in a third mode, in response to the second message comprising the valid temporary password, determine if the bearer token is valid and in response to the bearer token being valid, respond to the second message in a normal manner;
   in a fourth mode, in response to the second message not comprising the valid temporary password, determine that the second message is a Denial-of-Service attack in absence of a determination if the bearer token is valid.

4. The system of claim 1, wherein the valid temporary password is created using a Hash based Message Authentication Code (HMAC) and wherein the microprocessor readable and executable instructions further cause the microprocessor to:
   access a cache of valid temporary passwords for plural communication devices; and
   identify, by a hash map, one of the valid temporary passwords as being associated with the first communication device, wherein to determine if the first message comprises a valid temporary password; the microprocessor compares the identified one of the valid temporary passwords to a temporary password in the first message.

5. The system of claim 3, wherein the valid temporary password is based the temporary password and a time value as an input to a Hash based Message Authentication Code such that the valid temporary password expires upon expiration of the time value.

6. The system of claim 1, wherein the valid temporary password is precomputed and stored in a cache along with one or more other precomputed valid temporary passwords used by one or more other communication devices and wherein the microprocessor readable and executable instructions further cause the microprocessor to identify, by a hash map, one of the precomputed valid temporary passwords as being associated with the first communication device, wherein to determine if the first message comprises a valid temporary password; the microprocessor compares the identified one of the precomputed valid temporary passwords to a temporary password in the first message.

7. The system of claim 1, wherein a Hyper-Text-Transport Protocol header of the first message comprises the valid temporary password and wherein the microprocessor readable and executable instructions further cause the microprocessor to:
  in response to the first message not comprising the valid temporary password doing one of:
  respond to the first message based on a delay factor, wherein the delay factor is based on an increasing delay period or an exponentially increasing delay; or
  not respond to the first message.

8. The system of claim 1, wherein the valid temporary password is a one-time password that is regenerated for each received message during a communication session with the first communication device or based on a number of messages received during the communication session and wherein the microprocessor readable and executable instructions further cause the microprocessor to:
  access a cache of valid temporary passwords for plural communication devices; and
  identify, by a hash map, one of the valid temporary passwords as being associated with the first communication device, wherein to determine if the first message comprises a valid temporary password; the microprocessor compares the identified one of the valid temporary passwords to a temporary password in the first message.

9. A method comprising:
  receiving, by a microprocessor, a shared secret from a first communication device;
  creating, by the microprocessor, a temporary password based at least in part on the shared secret;
  receiving, by the microprocessor, a first message, from a first communication device, wherein the first message comprises an authentication token;
  accessing a cache of valid temporary passwords for plural communication devices, the cache of valid temporary passwords comprising the created temporary password as a valid temporary password; and
  identifying, by a hash map, one of the valid temporary passwords as being associated with the first communication device, the identified one of the valid temporary passwords being the created temporary password;
  determining, by the microprocessor, if the first message also comprises a valid temporary password, wherein to determine if the first message comprises a valid temporary password; the microprocessor compares the identified one of the valid temporary passwords to a temporary password in the first message;
  in response to the first message not comprising the valid temporary password, determining that the first message is a Denial-of-Service attack in absence of a determination if the authentication token is valid;
  in response to the first message comprising the valid temporary password, determining, by the microprocessor, if the authentication token is valid; and
  in response to the authentication token being valid, responding, by the microprocessor, to the first message in a normal manner.

10. The method of claim 9, wherein the authentication token is one of: a bearer token or an authentication credential and wherein the microprocessor readable and executable instructions further cause the microprocessor in response to the first message comprising the valid temporary password and valid authentication token, to send to the first communication device an authentication acknowledgement message comprising a bearer token different from the authentication token that identifies a user as authenticated.

11. The method of claim 10, further comprising:
  receiving a second message from the first communication device;
  determining if the second message comprises the valid temporary password; and
  in response to the second message comprising the valid temporary password, determining if the bearer token is valid; and
  in response to the bearer token being valid, responding to the second message in the normal manner.

12. The method of claim 11, wherein the valid temporary password is created using a Hash based Message Authentication Code (HMAC) and wherein in response to the second message not comprising the valid temporary password, the microprocessor does not respond to the second message in the normal manner.

13. The method of claim 9, wherein the valid temporary password is based in part on the temporary password and a time value as an input to a Hash based Message Authentication Code such that the temporary password expires upon expiration of the time value.

14. The method of claim 9, wherein the valid temporary password is precomputed and stored in the cache of temporary passwords along with one or more other precomputed valid temporary passwords used by one or more other communication devices.

15. The method of claim 9, further comprising:
  in response to the first message not comprising the valid temporary password, doing one of:
  responding to the first message based on a delay factor, wherein the delay factor is based on an increasing delay period or an exponentially increasing delay; or
  not responding to the first message.

16. The method of claim 9, wherein a Hyper-Text-Transport Protocol header of the first message comprises the temporary password and wherein the valid temporary password is a one-time password that is regenerated for each received message during a communication session with the first communication device or based on a number of messages received during the communication session.

17. A method comprising:
  sending, by a first communication device, a shared secret to a server;
  sending, by the first communication device, a first message to a server, wherein the first message comprises an authentication token and a valid temporary password based at least in part on the shared secret;

receiving, by the first communication device, a response to the first message, wherein the first message is responded to by the server in a normal manner and wherein the server sends the response to the first message based on determining if the first message comprises the valid temporary password and then determining if the authentication token is valid;

in response to the first message comprising the valid temporary password and valid authentication token, receiving, by the first communication device, an authentication acknowledgement message comprising a bearer token different from the authentication token that identifies a user as authenticated; and sending, by the first communication device, a second message to the server, the second message comprising the valid temporary password and bearer token, wherein the server sends a response to the second message based on determining if the second message comprises the valid temporary password and then determining if the bearer token is valid.

18. The method of claim 17, wherein the valid temporary password is based in part on a time value as an input to a Hash based Message Authentication Code such that the valid temporary password expires upon expiration of the time value.

19. The method of claim 17, wherein a Hyper-Text-Transport Protocol header of the first message comprises the valid temporary password and wherein the valid temporary password is created using a Hash based Message Authentication Code (HMAC).

20. The method of claim 17, wherein the valid temporary password is precomputed and stored in a cache of valid temporary passwords in the server along with one or more other precomputed valid temporary passwords used by one or more other communication devices and further comprising:

accessing, by the server, the cache of valid temporary passwords for the one or more other communication devices; and identifying, by the server using a hash map, one of the valid temporary passwords as being associated with the first communication device, wherein to determine if the first message comprises a valid temporary password; the server compares the identified one of the valid temporary passwords to a temporary password in the first message.

* * * * *